(12) United States Patent
Landrot

(10) Patent No.: US 6,220,177 B1
(45) Date of Patent: Apr. 24, 2001

(54) BOGIE FOR RAILWAY VEHICLE AND PROCESS FOR MANUFACTURING SAME

(75) Inventor: Alain Landrot, Le Creusot (FR)

(73) Assignee: Alstom Holdings, Paris (FR)

( * ) Notice: Subject to any disclaimer, the term of this patent is extended or adjusted under 35 U.S.C. 154(b) by 0 days.

(21) Appl. No.: 09/343,412

(22) Filed: Jun. 30, 1999

(30) Foreign Application Priority Data

Jul. 6, 1998 (FR) .................................................. 98 08620

(51) Int. Cl.[7] .................................................. B61F 3/00
(52) U.S. Cl. .................................. 105/182.1; 105/157.1; 105/200; 105/206.1; 105/226; 105/230
(58) Field of Search ............................ 105/182.1, 206.1, 105/200, 226, 227, 157.1, 199.1, 203, 230

(56) References Cited

U.S. PATENT DOCUMENTS

| | | | |
|---|---|---|---|
| 3,903,811 | * 9/1975 | Sinclair | 105/182.1 |
| 4,279,202 | * 7/1981 | Dieling et al. | 105/206.1 |
| 4,773,334 | 9/1988 | Nowak et al. | |
| 5,085,151 | * 2/1992 | Wako et al. | 105/206.1 |

FOREIGN PATENT DOCUMENTS

| | | |
|---|---|---|
| 565258 | 11/1932 | (DE) . |
| 0050727 | 5/1982 | (EP) . |

* cited by examiner

*Primary Examiner*—Stephen Avila
*Assistant Examiner*—Lars A. Olson
(74) *Attorney, Agent, or Firm*—Dowell & Dowell, P.C.

(57) ABSTRACT

A bogie for a railway vehicle which is supported on wheels mounted on at least two axles wherein the bogie includes a chassis which includes at least one housing in the form of a tubular beam which receives a side member which connects the at least two axles. The side member is selected based upon the anticipated use of the railway vehicle to which the bogie is to be secured.

11 Claims, 3 Drawing Sheets

BOGIE FOR RAILWAY VEHICLE AND PROCESS FOR MANUFACTURING SAME

BACKGROUND OF THE INVENTION

1. Field of the Invention

The present invention relates to a bogie for railway vehicle and to a process for manufacturing such a bogie.

2. History of the Related Art

A railway vehicle bogie is intended to support a vehicle, such as a box body or rail car, abutting on a plurality of wheels distributed on axles.

Taking into account the masses of the box bodies or rail cars and their speed of displacement, the forces due to accelerations of this stock, particularly during changes of direction, are considerable, with the result that it is usual to produce bogies in the form of massive parts made of steel or of welded structures. These massive parts and welded structures have a fixed configuration as from design, with the result that they cannot be adapted, during manufacture, to the conditions of use of the bogies.

Now, the wheel base of the bogie, the height of the box body, the track width and the load on the axle are parameters which vary from one bogie to another which must be taken into account during design. In practice, there is a tendency to overdimension the bogies to allow them to withstand the forces undergone in all the configurations, which increases the cost of the bogies and their rigidity, which must be compensated by suspension and damping systems adapted to ensure comfort for passengers or the absorption of the vibrations due to the irregularities of the tracks on which the stock travels.

European Patent Application 0 031 008 discloses a railway vehicle bogie comprising H-shaped webs made of composite material. These webs have a cross-section and length defined from casting, with the result that they cannot be adapted to the conditions of use of each bogie.

It is a particular object of the present invention to overcome these drawbacks by proposing a bogie which may be adapted to its conditions of use, including during manufacture and even at the end of manufacture thereof.

SUMMARY OF THE INVENTION

To that end, the invention relates to a bogie for railway vehicle, this bogie being in abutment on wheels mounted on at least two axles, at least one side member being provided to connect these axles to a chassis, characterized in that the chassis forms at least one housing, in the form of a tube opening at its two ends, for receiving the side member.

Thanks to the invention, the chassis, on the one hand, and the side member or members, on the other hand, may be manufactured independently from one another, the side members being manufactured with different geometries adapted to the different conditions of use of the bogie. In particular, the side members may correspond to different wheel bases of the bogie, to a variable load on the axle and to a variable box body height. During manufacture, it is then possible to choose a side member adapted to the final conditions of use of the bogie, to mount it on a chassis which may be common to the different types of side members used. Such versatile manufacture, due to the modularity of the concept of the bogie of the invention, makes it possible easily to adapt the bogies to their real conditions of use. This versatility also enables the side members of a bogie to be replaced during its life, this making it possible to adapt its mechanical properties to possible new conditions of use of the bogie.

According to a first advantageous aspect of the invention, the housing is provided with means for immobilizing the side member with respect to the chassis. These means may be formed by bolted devices or elastomer-coated articulated jaws fixed inside the housings.

According to another advantageous aspect of the invention, the inner cross-section of the housing is adapted to follow the outer shape of the side member. Thanks to this aspect of the invention, the bearing of the side member may be made over the whole length of the housing, which guarantees a good distribution of the mechanical forces between the side member and the chassis and therefore a good stability of the bogie thus formed. It is also possible to provide that the bearing of the side member on the chassis be made with to articulation means distributed over the length of the housing, thus allowing considerable suppleness of the side member.

According to variants of use of the invention, the chassis and the side member may be made of composite material or of steel.

According to another advantageous aspect of the invention, the chassis comprises two hollow beams extending in a direction substantially parallel to the normal direction of movement of the vehicle, a housing for receiving a side member being made in each beam. This aspect of the invention makes it possible to give the chassis a simple geometry, which enables the cost of such stock to be efficiently controlled. The chassis is advantageously of substantially parallelepipedic shape and provided with a central recess bordered by the hollow beams and by two webs provided with means for fixing functional elements of the bogie. In that case, it may be provided that the webs be made of composite material and that the fixing means comprise at least one elongated, rigid support secured to in one of these webs, this support being adapted to removably receive, at several places distributed over its length, means for fastening functional elements of the bogie.

The invention also relates to a process for manufacturing a bogie as described hereinbefore and, more specifically, to a process which consists in:

- making a chassis provided with at least one housing for receiving a side member for supporting the chassis in abutment on two wheel axles;
- choosing, from several side members of different geometries, a side member adapted to the use envisaged for the bogie;
- inserting this side member in the housing, and
- securing the side member inside the housing.

BRIEF DESCRIPTION OF THE DRAWINGS

The invention will be more readily understood on reading the following description of an embodiment of a railway vehicle bogie in accordance with its principle, and of its process of manufacture, given solely by way of example and made with reference to the accompanying drawings, in which.

DESCRIPTION OF PREFERRED EMBODIMENT

Figure 1:
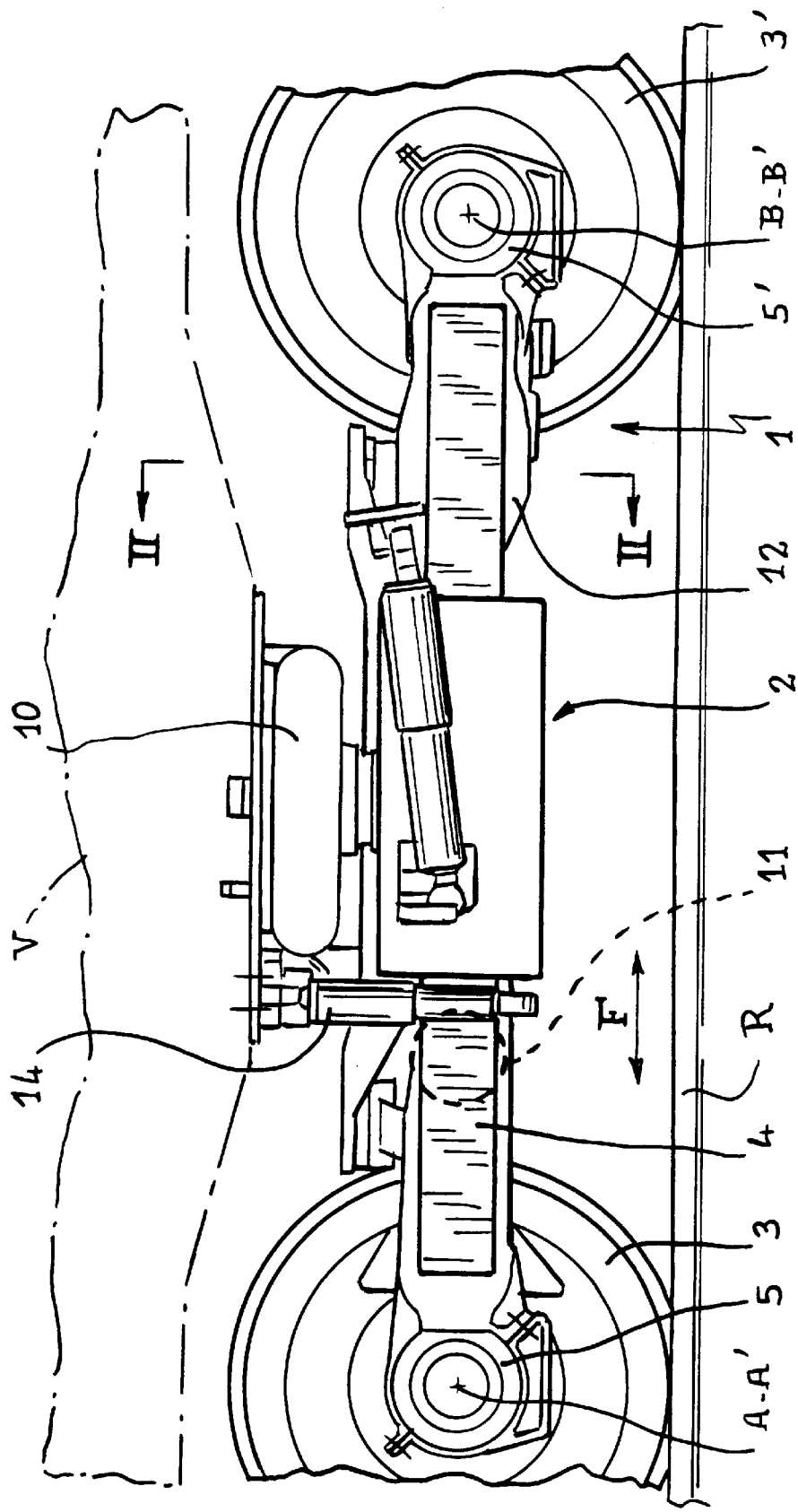
FIG. 1 is a side view of a railway vehicle bogie according to the invention.
Figure 2:
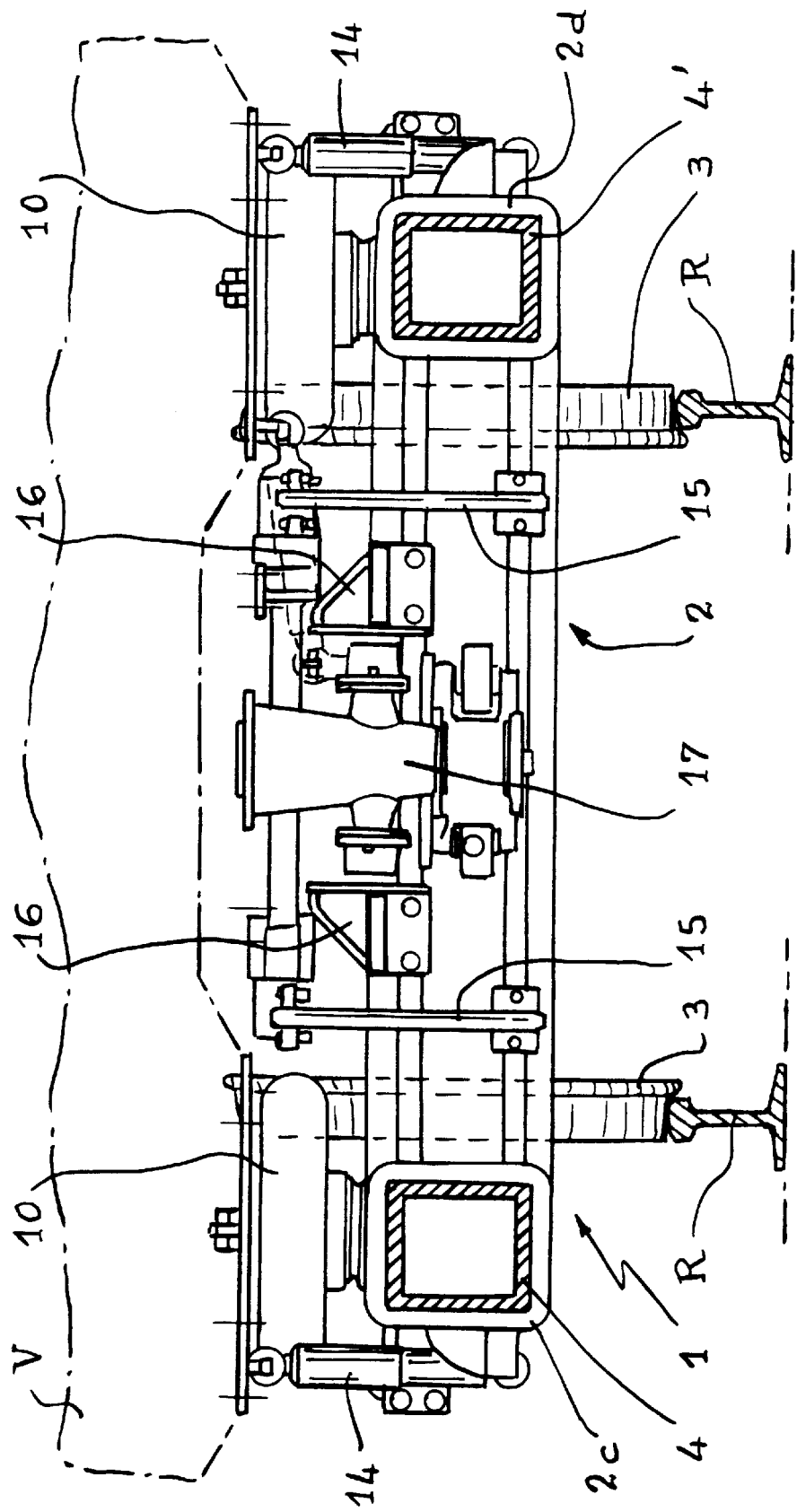
FIG. 2 is a section along line II—II of FIG. 1.

Referring now to the drawings, the bogie 1 shown in FIG. 1 is intended to support a railway vehicle V, shown in dashed and dotted lines, in abutment on rails, of which only one, referenced R, is visible in FIG. 1. This bogie 1 is supported by two wheel and axle sets 3 and 3' grouped on axles represented by axes of rotation A–A' and B–B' of the wheels. Side members 4 and 4' are provided to support a chassis 2 in abutment on axle boxes 5 and 5' of wheels 3 and 3'.

The chassis 2 and side members 4 and 4' are made of composite material, preferably based on epoxide or phenolic resin reinforced with glass, carbon, aramid or equivalent fibers. In this way, the bogie is substantially lighter than conventional bogies made of steel, while it has excellent mechanical properties and its cost may be relatively low.

Secondary suspension elements 10 are provided to be interposed between the chassis 1 and the box body of the vehicle V. A drive motor 11 and a braking system 12 are also supported by the chassis 2. Shock absorbers 14 are interposed between moving parts of the bogie 1. Connecting rods 15 are articulated on the chassis 2 while stops 16 are disposed around a drive pin 17 in order to limit the transverse stroke thereof. Elements 10 to 17 constitute functional elements of the bogie 1.

Depending on the type of bogie, whether it be bearing or driving, on the equipment specific to this type of bogie and on the optional equipment of the vehicle V, the functional elements 10 to 17 or equivalent may be of variable size and shape, this having an influence on their implantation with respect to the chassis 2.

Rails 20 are provided to be integrated in the structure of the chassis 2, more precisely inside two beams 2a and 2b of this chassis which extend substantially perpendicularly to the direction of movement of the vehicle V on the rails R, represented by arrow F in FIG. 1.

These rails 20 have a C-shaped cross-section and slide blocks 30 are disposed in the interior volume of each rail 20 so as to be able to move in translation along this rail. Each slide block 30 is provided with a central tapping intended to receive a fastening screw, which, when tightened in the corresponding tapping, immobilizes a support 33 for one of the elements 10 to 17. As the slide blocks can be displaced inside the rails 20, the elements 10 to 17 may be removably received on the rails 20 at several locations distributed over its length.

Figure 3:
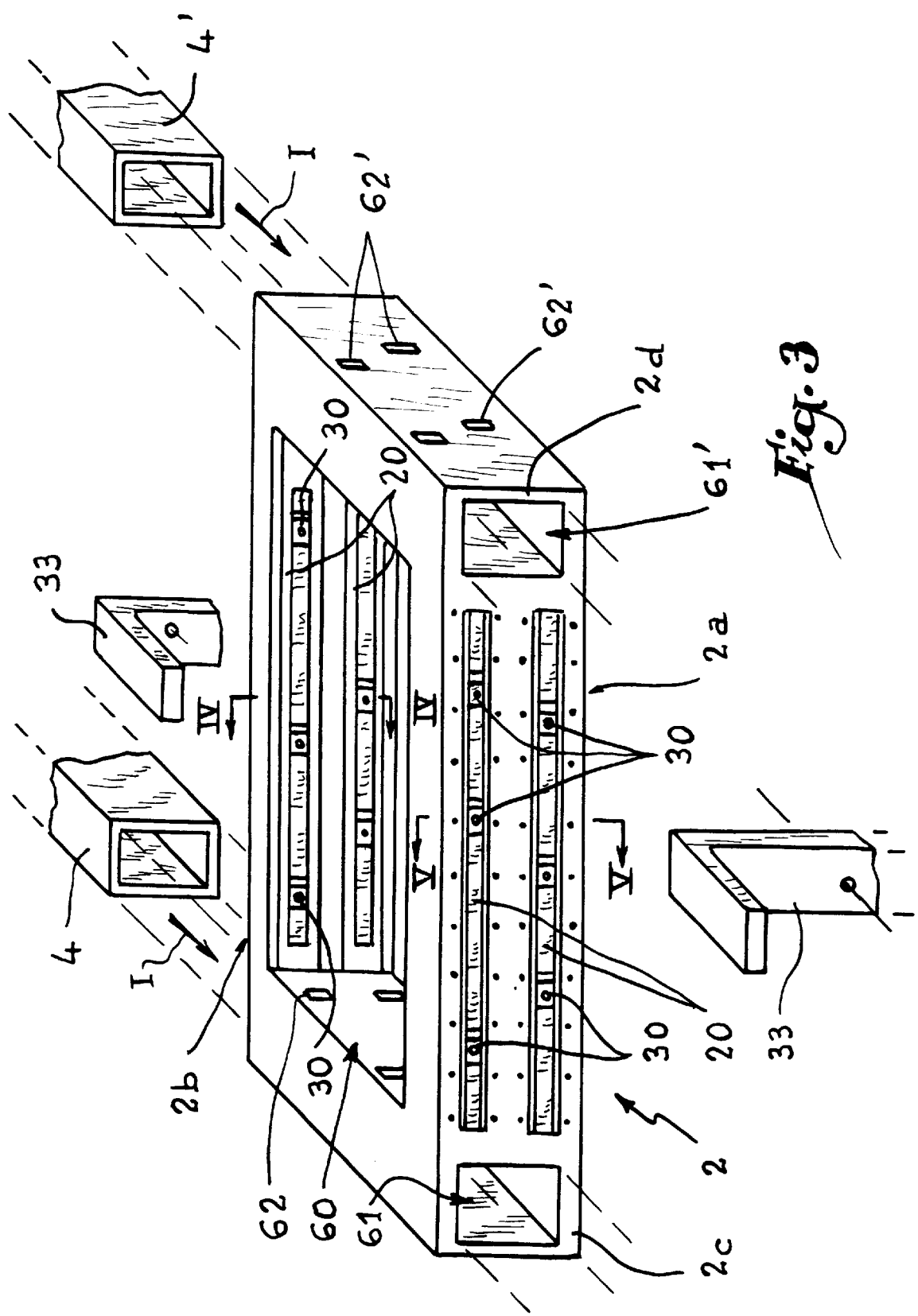
FIG. 3 schematically shows, in exploded view in perspective, certain structural elements of the bogie of FIGS. 1 and 2.

As shown in FIG. 3, the chassis 2 is substantially parallelepipedic in shape and comprises a central recess 60 of which the two beams 2a and 2b constitute two borders. The other two borders of the recess 60 are constituted by two hollow beams 2c and 2d connected to beams 2a and 2b by the continuity of the composite material forming the chassis 2.

According to the invention, the respective interior volumes 61 and 61' of the hollow beams 2c and 2d constitute houses for receiving the side members 4 and 4'. These housings 61 and 61' may be traversed right through by the side members 4 and 4' in order to connect the axle boxes 5 and 5'.

In this way, manufacture of a bogie according to the invention includes a step of insertion of the side members 4 and 4' inside the housings 61 and 61', as represented by arrows I in FIG. 3, these side members having been previously selected as a function of the use of the bogie and, in particular, of its wheel base, its axle load and the height of the box body provided. The invention therefore makes it possible to attain a particularly advantageous modularity of a railway vehicle bogie insofar as a single type of chassis may be used with different side members, as a function of the final use of the bogie.

The inner section of the housings 61 and 61' is substantially equivalent to the outer section of the side members 4 and 4', with the result that the cooperation of shapes of these elements contributes to a good immobilization of the side members inside the housings.

Taking into account the traversing nature of the housings 61 and 61' and the fact that the side members extend on either side of the chassis 2, i.e. in front of or behind the latter with respect to the direction of movement F of the vehicle on the rails, the bearing surface of the side member 4 and 4' inside the housings 61 and 61' is substantially equal to the length of the beams 2c and 2d, with the result that the fixation of the side members with respect to the chassis may be effective over a great length.

Furthermore, the beams 2c and 2d comprise inserts 62 and 62' for securing the side members 4 and 4' inside the housing 61 and 61'. Such inserts are provided with locking members such as screws intended to cooperate with corresponding means provided in the side members 4 and 4'.

The invention has been disclosed with a chassis and side members made of composite material. However, it is also applicable with structural elements made of other materials, and in particular of steel.

The invention has been shown with side members 4 and 4' of square or rectangular cross-section and of substantially rectilinear shape; it is obvious that it is applicable whatever the geometry of the side members and in particular with side members in the form of a flattened loop, the means for fastening the side members inside the corresponding housings being adapted accordingly.

What is claimed is:

1. A bogie for a railway vehicle which bogie includes at least two axles having wheels supported at opposite ends thereof, a chassis positioned on said at least two axles and including at least one hollow beam extending in a direction from one of said at least two axles toward the other of said at least two axles, at least one side member extending through said hollow beam and said at least one side member being connected at opposite ends to said at least two axles.

2. The bogie of claim 1 wherein said chassis includes means for securing said at least one side member within said hollow beam.

3. The bogie of claim 2 wherein said means for securing is selected from a group of devices consisting of bolts and elastomer-coated articulated jaws.

4. The bogie of claim 1 wherein said hollow beam includes an inner cross-sectional configuration which is generally the same as an outer cross-sectional configuration of said at least one side member.

5. The bogie of claim 1 wherein a bearing support for said side member in said hollow beam includes articulation means extending over a length of said hollow beam.

6. The bogie of claim 1 wherein said chassis and said at least one side member are made of composite materials.

7. The bogie of claim 1 wherein said chassis and said at least one side member are made of steel.

8. The bogie of claim 1 wherein said chassis includes two generally parallel hollow beams oriented in spaced relationship with respect to one another for receiving two spaced side members extending between and connected to said at least two axles.

9. The bogie of claim 8 wherein said chassis is substantially parallelepipedic in configuration including two cross-beams extending between and connected to said two hollow beams and being spaced so as to define a central opening therebetween, and at least one of said two cross-beams including means for securing elements to the bogie.

10. The bogie of claim 9 wherein said cross-beams are made of composite material and said means for securing elements including at least one elongated rigid support secured to said at least one of said cross-beams, said elongated rigid support being adapted to removably receive fasteners for securing said elements to the bogie at a plurality of locations along the length of said elongated rigid support.

11. A process for manufacturing a bogie for a railway vehicle wherein the bogie includes a chassis to which is connected at least one side member which extends between and is connected to at least two wheel axles, the process comprising the steps of:

a) forming the chassis so as to have at least one hollow beam for selectively receiving a side element therethrough;

b) providing a plurality of side members of differing structural characteristics dependent upon anticipated end use of a railway vehicle to which the bogie is to be secured;

c) selecting one of said side members from the plurality of side members depending upon anticipated use;

d) inserting said selected side member in said hollow beam; and e) securing said selected side member within said hollow beam to thereby secure said two wheel axles to said chassis.

* * * * *